United States Patent [19]

Finlan et al.

[11] Patent Number: 5,047,633

[45] Date of Patent: Sep. 10, 1991

[54] IMAGING APPARATUS AND METHOD

[75] Inventors: Martin F. Finlan, Aylesbury; Ian A. McKay, Chalfont St. Giles, both of England

[73] Assignee: Amersham International plc, Buckinghamshire, England

[21] Appl. No.: 518,543

[22] Filed: May 3, 1990

[30] Foreign Application Priority Data

May 8, 1989 [GB] United Kingdom ................. 8910566

[51] Int. Cl.$^5$ ............................................ H01J 37/00
[52] U.S. Cl. .................................... 250/306; 250/307
[58] Field of Search ...................... 250/306, 307, 423 F

[56] References Cited

U.S. PATENT DOCUMENTS

| 4,851,671 | 7/1989 | Pohl | 250/306 |
| 4,868,396 | 9/1989 | Lindsay | 250/306 |
| 4,906,840 | 3/1990 | Zdeblick et al. | 250/307 |
| 4,924,091 | 5/1990 | Hansma et al. | 250/306 |
| 4,935,634 | 6/1990 | Hansma et al. | 250/306 |

FOREIGN PATENT DOCUMENTS 0247219 2/1987 European Pat. Off.
0309236 3/1989 European Pat. Off.

OTHER PUBLICATIONS

Hameroff et al., "Proc. Ann. Int. Conf. IEEE Eng. Med and Biol. Soc.", (New Orleans, LA Nov. 4-7, 1988), 10, 1009-1011 (1988).

Hansma et al., "J. Appl. Phys.", 61(2) R1-R23 (Jan. 15, 1987).

Albrecht et al., "J. Vac. Sci. & Tech., Part A", 6(2), 271-274 (Mar./Apr. 1988).

IBM Tech. Discl. Bull. 31(3), 335 Aug., 1988.

IBM Tech. Discl. Bull. 30(6) 343 Nov., 1987.

Primary Examiner—Bruce C. Anderson
Attorney, Agent, or Firm—Wenderoth, Lind & Ponack

[57] ABSTRACT

Apparatus for the high resolution imaging of macromolecules and interactions involving macromolecules. The apparatus comprises a surface (10) on which the macromolecule under test is placed and a plurality of fine probes (13). Means (not shown) are provided for scanning each of the probes (13) across a small area of the surface 10 in such a way that the total output from the probes covers the whole surface. Means (not shown) such as a scanning tunnelling and/or atomic force detector are used to monitor the movement of the individual probes in a direction transverse to the surface (10) and display means (not shown) are used to display the transverse movement of the probes, being illustrative of the topography of the surface.

18 Claims, 8 Drawing Sheets

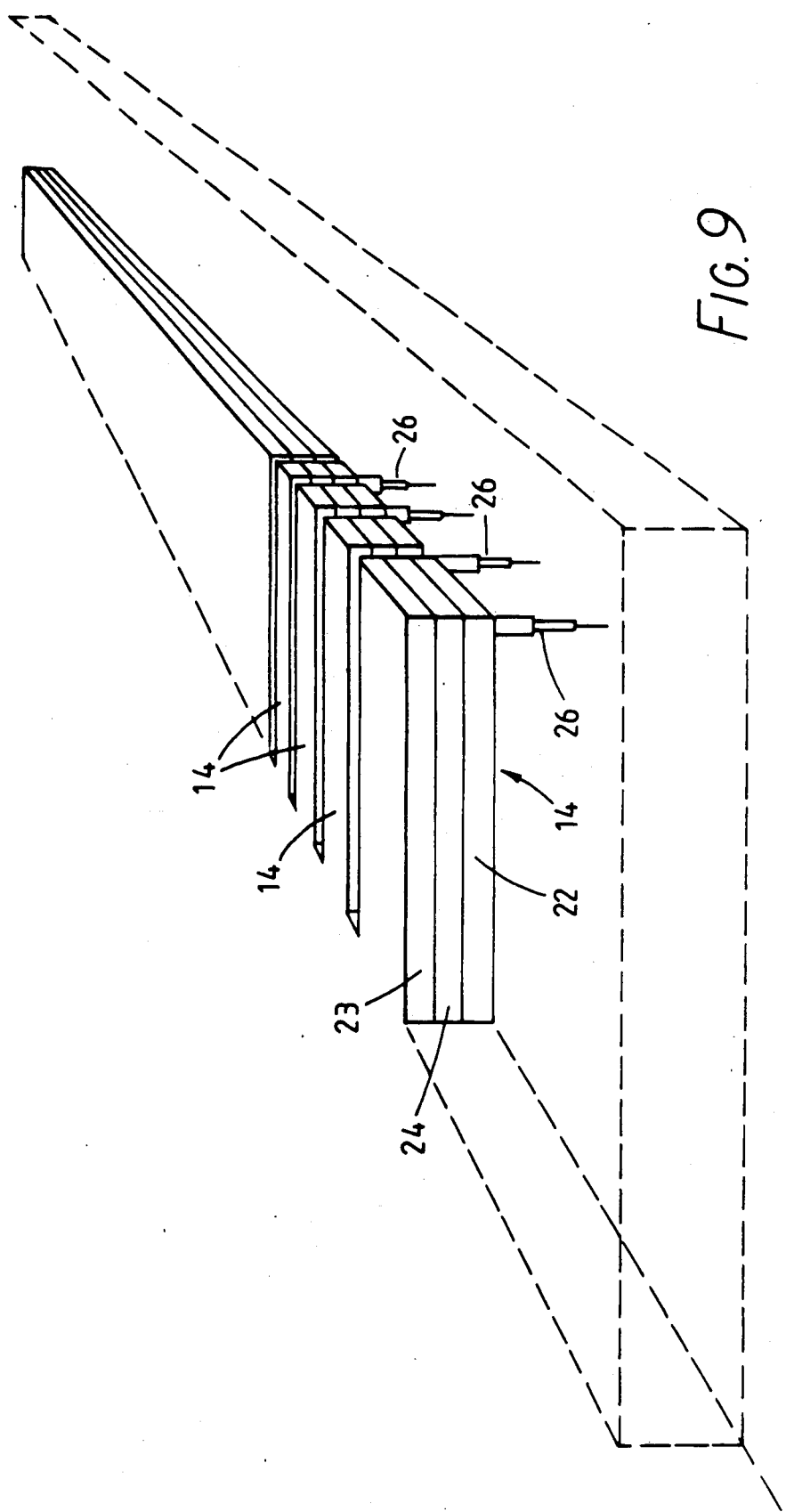

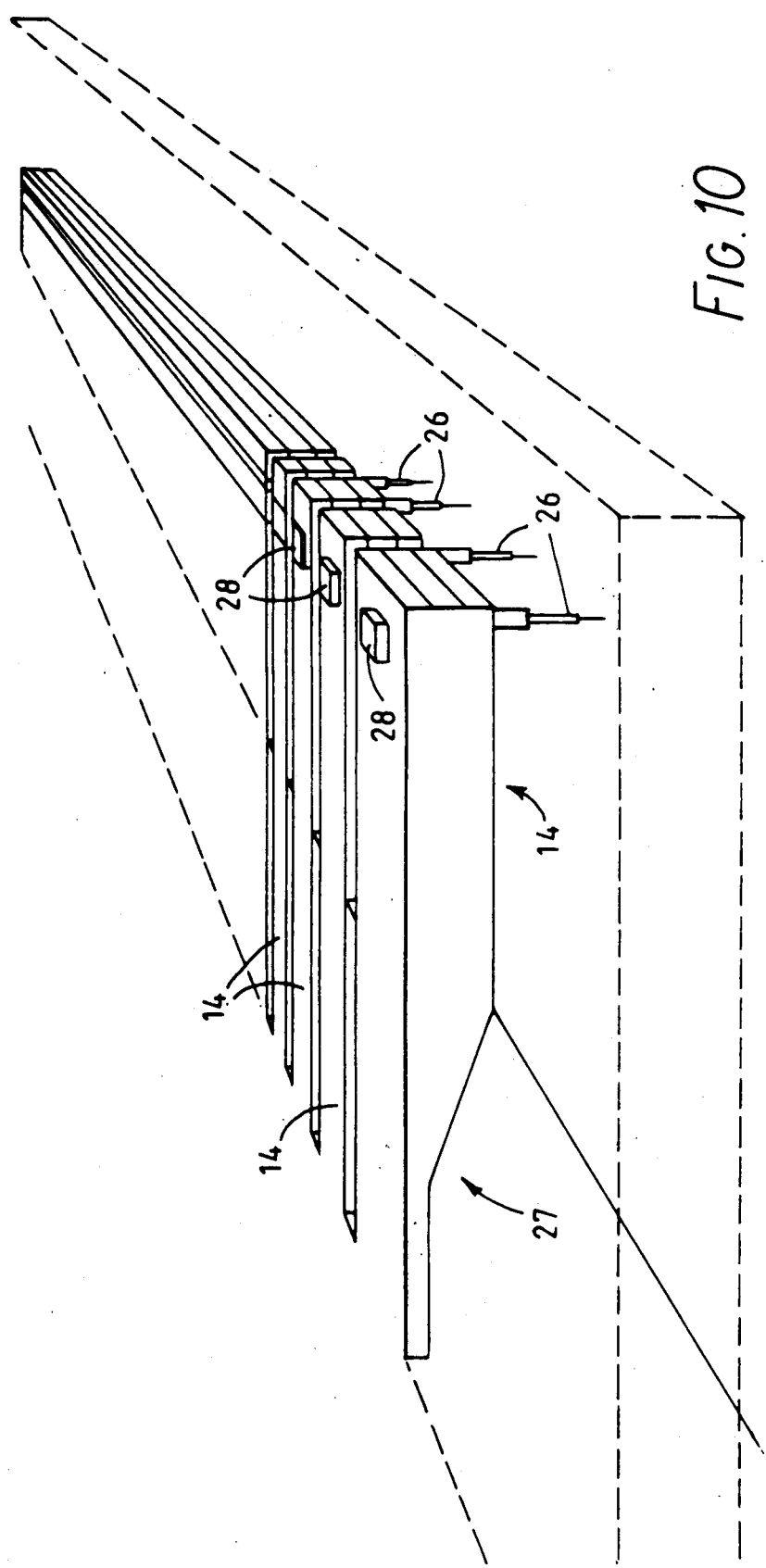

IMAGING APPARATUS AND METHOD

This invention relates to a method and apparatus for imaging, in particular for the high resolution imaging of macromolecules such as proteins, polypeptides, RNA and DNA and interactions therebetween.

A primary use of the techniques described herein is for the sequencing of macromolecules—i.e. the determination of the order of nucleotides or other components making up the molecule.

Sequencing is currently carried out by electrophoresis which involves initial chemical treatment of a sample to be tested followed by electrophoresis and subsequent autoradiography or similar to produce the now-familiar pattern of the arrangement of the bases within the molecule under test. Electrophoresis, while generally effective, is a lengthy process requiring many steps and is subject to error, particularly in the analysis of the results.

The present invention addresses the problem of sequencing in a different way: for example, there are significant size and shape differences as between the molecules of each of the four bases making up the structure of the DNA molecule, and these differences are sufficient to enable them to be structurally distinguished from one another. If therefore the DNA (or whatever) molecule can be examined directly with sufficient resolution, the arrangement of those parts of the molecule which are necessary to sequence the molecule can be ascertained. This invention provides a method and apparatus which is intended to achieve this aim, and thus enable "direct" sequencing of such molecules as DNA. The invention also provides means whereby the resultant of interactions between macromolecules and between macromolecules and other chemicals can be given a detailed structural analysis.

In the method of the invention the molecule under test is placed, and preferably immobilized, on a surface. The surface is then scanned in order to ascertain its topography and, provided this last step is carried out at a sufficient resolution, the arrangement of the component parts of the molecule under test can be directly ascertained. In many cases it will be necessary to split the molecules under test into manageable lengths using restriction enzymes or other techniques appropriate to the material being tested. Advantageously, the surface on which the topographic examination is carried out is flat, preferably atomically flat.

Thus, the invention enables routine sequencing to be carried out by direct analysis of the molecules under test. For sequencing it is, of course, necessary to be able to see individual bases and the techniques of the present invention enable the bases to be seen with a sufficient resolution to enable them to be structurally distinguished from one another. As mentioned above, the bases are structurally distinguishable in their natural state, but the differences between them can be enhanced by selective application of labels of appropriate physical size to the four bases (A, T, C or G) which will enable them to be easily identified.

One way of immobilizing the lengths of molecules on the surface is to pretreat the surface with a plurality of isolated reaction sites. Each reaction site will have a particular chemical imprinted on it, which chemical is chosen to be suitable to bind with and thus attach a length of molecule. For this purpose, the molecule under test may be chopped in special places by particular restriction enzymes so that the free end of the molecule will bind to the chemical printed on the reaction site. As an extension of this process, the chopping enzyme may be such as to add a specific chemical grouping from the enzyme on the end of the chopped length, which chemical grouping will be such as to match, and thus bind to, the chemical printed on the reaction site.

In this way, the introduction of a fluid containing molecules chopped in the manner described above against a suitably treated surface will cause one end of at least some of the lengths of molecule to attach themselves to the reaction sites on the surface. When a sufficient number of molecules are attached, the surface may be irradiated with ultraviolet (UV) which acts to cross link the lengths of molecule under test to the surface. The action of the UV is to generate free radicals ($OH^-$, $H^+$) from the lengths of molecule which, if the surface is suitable (for example, made of copper or silicon) will bind thereto.

In a preferred form of the method, the fluid containing the lengths of molecules under test is caused to flow over the surface so that the molecule lengths not only attach themselves at their ends to the reaction sites, but also align themselves along the direction of fluid flow. It will be seen that, provided a suitable pattern of reaction sites is printed on the surface in the first place, the lengths of molecule under test can be immobilized on the surface in such a way that they are all spaced apart from one another, with no overlap, and in alignment, making subsequent analysis very much easier.

There are various ways in which the surface, including the lengths of molecule under test, may be scanned to enable analysis of the molecule. If we take mutually orthogonal x, y and z axes, with the surface in the x, y plane, then the undulations of the surface (due to the lengths of molecule thereon) is analyzed by x-y scanning a fine probe across the surface and analyzing the movement of the probe in the z-direction which maps the topography of the surface-i.e. its height along the z-axis with variation in x and y. The probe may be gently biased onto the surface with sufficient force to keep it in contact with the surface but not too great a force to damage the surface. Alternatively, feedback techniques, explained in more detail later, may be used to control the height of the probe in the z-direction so that it follows the undulations in the surface without actually touching the surface.

The tip of the probe needs to be very fine in order to achieve good resolution. Typically, a tungsten tip with a radius of curvature of the order of one atom radius would be used.

A single probe can be used to scan over the whole surface containing the lengths of molecule being tested. However, in order to accommodate a sufficient number of lengths of molecule or the result of a macromolecular interaction, the surface needs to be reasonably large—typically 5 mm. square. To monitor such a size with a single one atom tip probe at a sufficient resolution would take a considerable time and it is therefore preferred to provide a plurality of probes, each arranged to x-y scan over its own particular area. The scanned areas are arranged in a pattern to cover the whole of the surface to be analysed. Preferably adjacent areas overlap slightly.

There are various ways for monitoring the movement of the probe; for example optical interferometric, capacitative, inductive and so-called scanning tunnelling methods—some of these methods will be described in more detail below.

One of these methods—scanning tunnelling—could be used to directly monitor movement of the probe. The technique of scanning tunnelling is described in "Scanning tunnelling microscopy: instrument design and application in air and vacuum" by Sang-il Park et al., Scanning Microscopy Technologies and applications (1988) Vol. 897, page 8. The scanning tunnelling microscope is able to map the topography of a surface with extremely high resolution. The basic component of a scanning tunnelling microscope is a very sharp tip (for example a single atom tip, such as described above), which tip is mounted for movement along three mutually orthogonal axes: x, y and z. A scanner, for example of piezoelectric type, is used to move the tip with high precision along the three axes. A diagrammatic and much simplified view is presented in FIG. 1 of the accompanying drawings. The tip, shown under reference 1, is driven by a scanner comprising respective orthogonally-arranged piezoelectric bars 2, 3 and 4 for the x, y and z axes respectively. Bars 2 and 3 are energized to cause the tip 1 to execute raster (x,y,) scanning across the surface 5 whose topography is being studied. The surface 5 is positioned with respect to the tip in such a way that the gap between the tip and the surface is very small—typically less than 10Å— but not touching. At this spacing the application of a suitable potential between the surface and the tip causes electrical current to pass across the gap, the magnitude of the current being very sensitively dependant upon the spacing. External electronics 6 are used to monitor this current and by way of a feedback loop, to control the z-axes piezoelectric bar 4 in such a way as to keep a constant distance between the tip and the surface. Thus the electrical signal applied to the z-axes bar 4 is indicative of the z coordinate of the tip at any time and therefore, by synchronization with the x-y raster scanning, a three-dimensional topographical picture of the surface can be built up on a display 7 or similar.

The current which passes between the surface and the tip is believed to be caused by quantum mechanical tunnelling-hence the name-and is inversely exponentially proportional to the gap spacing. The instrument is very sensitive-typically a variation of 1Å in the gap spacing can cause the current to change by an order of magnitude.

The prepared sample on the surface of the present invention can be scanned directly in the manner described above to create an image of the topography of the surface to angstrom resolution. However, one disadvantage of direct monitoring in this way is that the surface has to be electrically conductive in order to carry the tunnelling current. In addition, and assuming that the surface is conductive, any variations in conductivity over the surface will effect the accuracy of the instrument. Therefore, it is preferred to utilise a fine probe, which may or may not be conductive and which is lightly biased into contact with the surface, as described above, and to use the scanning tunnelling technique to monitor the movement of the probe. As mentioned above, however, this is not the only way of monitoring movement of the probe.

Assuming that the scanning tunnelling technique is not being used directly, then it will be necessary to provide some means for providing the aforesaid gentle biasing of the probe tip onto the surface being analysed. Mechanical spring force may be used, but if so, feedback techniques have to be used to compensate for the inherent non-linear characteristics, and thereby keep the applied force constant. An alternative approach is to use a magnetic or electromagnetic field to produce the necessary force. Examples of all three are described hereinafter.

As well as scanning molecules for the purpose of sequencing, the method and apparatus of this invention may also be used to structurally analyze the results of reactions and in particular to ascertain whether particular molecules have, or have not, bound with one another. It is believed that the techniques described herein could be used to analyze the result of many types of macromolecular interactions, such as the interaction of DNA with one or more DNA binding proteins, antibody-antigen interactions, enzyme-substrate interactions, and enzyme-cofactor interactions, and so on.

One problem with the method of the invention, particularly when investigating the result of chemical interactions, as envisaged above, is that it is often difficult to know where on a particular surface to look and, perhaps more particularly, whether or not to look at all. The resolution of the techniques described herein is such that full analysis of a surface on which an interaction has taken place may take some time; this is time which would be wasted if there is nothing to look at or if what there is to look at is present only in one particular position on the surface.

Accordingly, what is needed is a broader "filter" for such situations which can examine the surface quickly and perhaps give details of where on the surface to look or even whether to look at all. To this end, the techniques of this invention could be combined with those of surface plasmon resonance (SPR) to produce a generalised biosensor which would make an initial test on a surface, using SPR, and then test the same surface, if necessary, using the techniques of the present invention. The phenomenon of SPR is known for use in biosensors and is described, for example in our European Patent Application No. 0305109. The SPR technique is able to rapidly supply information as to whether or not a particular reaction has taken place—for example whether or not binding has taken place and is therefore able to provide information as to whether it is worthwhile to proceed with the techniques of the present invention to provide a more detailed structural analysis. Thus, as an example, molecules bound to surfaces of biosensors for functional analysis by SPR may be further structurally analyzed using the techniques of the present invention. Proteins such as antibodies or enzymes can be attached to the surface of a biosensor for purposes of analysis by SPR. It is suggested that another class of proteins, the DNA binding proteins, might similarly be attached to a biosensor surface. Further, addition of DNA (in single-stranded, double-stranded, circular or supercoiled form) to the biosensor surface should result in binding of the DNA to the immobilized DNA binding proteins. This interaction should be detectable by SPR.

The image generated by the techniques of the present invention indicate the structural relationship between a DNA protein and the DNA molecule. In princple the techniques of the present invention could be applied to DNA molecules immobilized by DNA binding proteins or biosensor surfaces providing an assay for:

(a) binding of DNA by a protein;

(b) subsequent binding of other molecules to the DNA molecule;

(c) the structural basis of DNA-protein interactions; and (d) the kinetics of the above reactions.

In order that the invention may be better understood, some embodiments thereof will now be described by way of example only and with reference to the accompanying drawings in which:

FIGS. 8 and 9 are plane and perspective views respectively of a micro-machined probe array suitable for use with the present invention;

FIG. 10 is an alternative arrangement of the probe array of FIG. 9;

Figure 2:
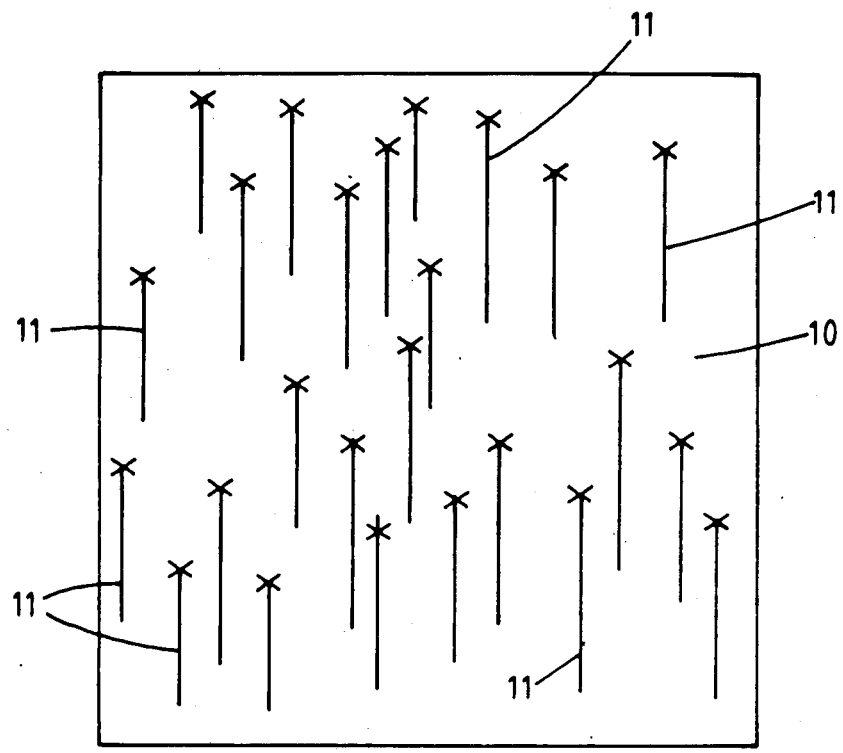
FIG. 2 is a plan view of a surface on which are fixed lengths of a molecule to be analyzed.

Referring firstly to FIG. 2, there is shown diagrammatically a flat surface 10 on which a sample molecule or molecules typically of DNA, are attached, or on which the result of a macromolecular interaction is placed. The surface should be atomically smooth— i.e. no undulations greater than the size of an atom, and one way of achieving this is by an "etching" technique, using a scanning tunnelling microscope.

As explained above, where a single molecule is being sequenced, the molecule will be split into "manageable" lenths, typically 1000 base pairs long, using restriction enzymes or other appropriate chemicals. These lengths are represented by straight lines 11 and the cross sign at one end of each indicates the point of attachment to the surface, for example by means of reaction sites, as described above. The drawing is diagrammatic and not to scale: typically 1000 base pairs of DNA stretched out in a line is about one micron long; the size of the whole surface is typically 5 mm square.

The DNA is affixed to the surface by flowing over the surface a fluid containing DNA, or whatever, molecules to be sequenced which have been pre-treated to divide them into lengths. When a sufficient number of lengths have been attached, the surface 10 is irradiated with UV to cause cross linking of the lengths to the surface (see above). The flow technique ensures that all of the lengths are approximately parallel and extend in one direction from their attachment points.

Figure 1:
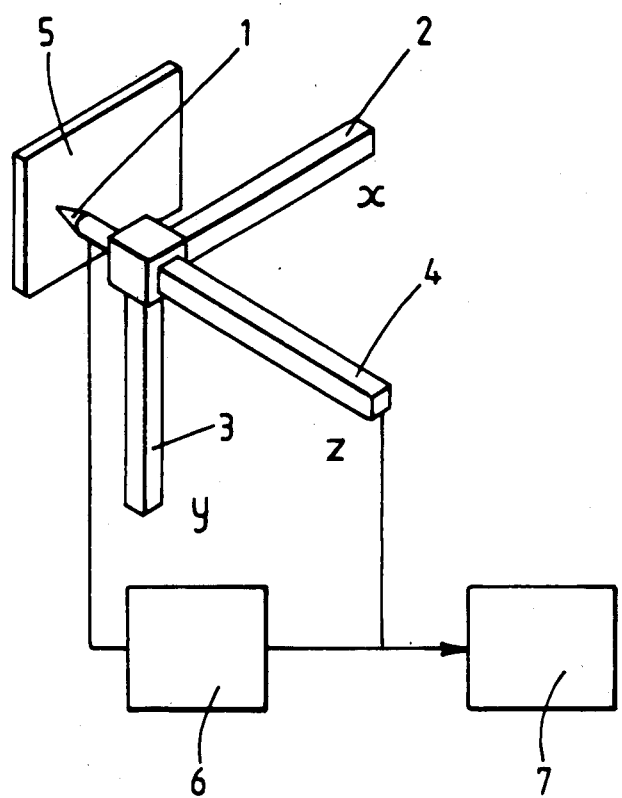
FIG. 1 is a simplified diagrammatic perspective view of a scanning tunnelling microscope.

Referring again to FIG. 1, it will be seen that the instrument shown could be used to analyse the surface 10. The normal x-y scanning range of the probe of the scanning tunnelling microscope is approximately 500 microns square, in coarse scanning mode, or approximately 0.02 microns square, in fine scanning mode. The scanning speed of the probe is about 0.4 micron/second, so it would take 50 seconds to scan one 20 micron long line, or nearly 3000 hours to scan a 20 micron square area to a lateral resolution of 1Å. In practice, in the fine mode, the scanning lines are only 0.1 to 0.2 Å apart which makes the time even greater.

Figure 3:
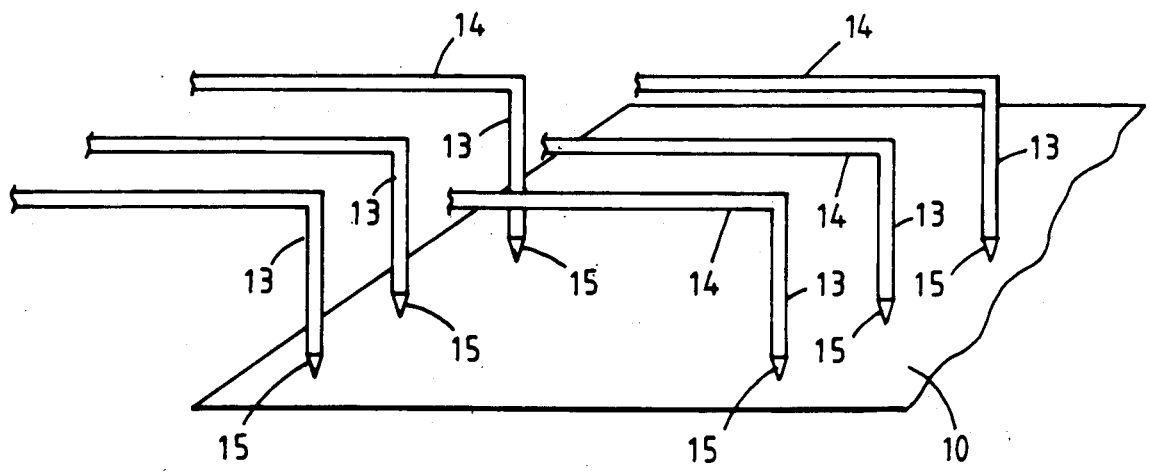
FIG. 3 is a diagrammatic perspective view of part of the scanning system used in the present invention.
Figure 4:
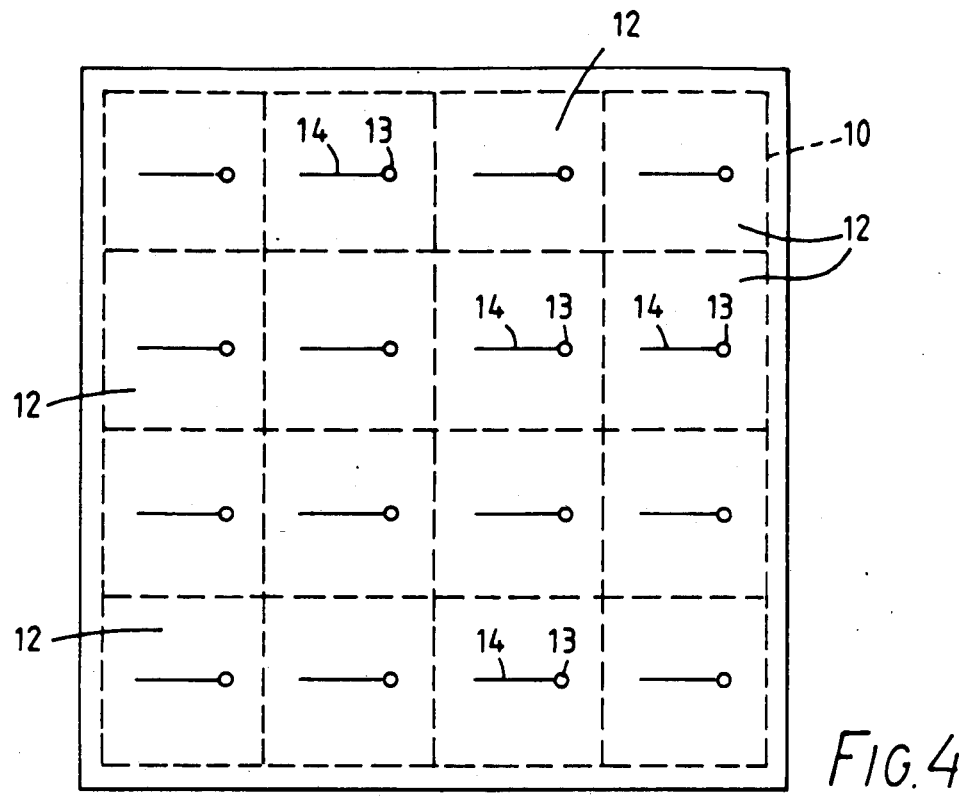
FIG. 4 is a plan view showing how the surface of FIG. 2 may be divided up for scanning.

In the present invention this problem is solved by dividing the area to be scanned into a plurality of cells, and utilising a single probe to monitor each cell. FIGS. 3 and 4 show diagrammatically such an arrangement. The surface 10 to be scanned (shown dotted in FIG. 4) is divided into a large number of cells 12 each of which is scanned by a respective probe 13. Each probe is supported on a respective cantilever 14 and means (not shown) are provided for causing scanning of each of the probes across their respective cells. Typically piezoelectric scanning is used. The cantilever acts as a spring to lightly bias the probe onto the surface 10. In order to maintain the applied force at a constant level, feedback techniques are used. Preferably the cells overlap slightly in practice to ensure complete coverage. The tip 15 of the probe is brought to a very fine point, typically of one atom size. Typically, for a 5 mm square surface 10, there would be 500 cells 12 in an array of 10 by 50 (i.e. each cell would be approximately 100 microns by 500 microns in size).

Figure 5:
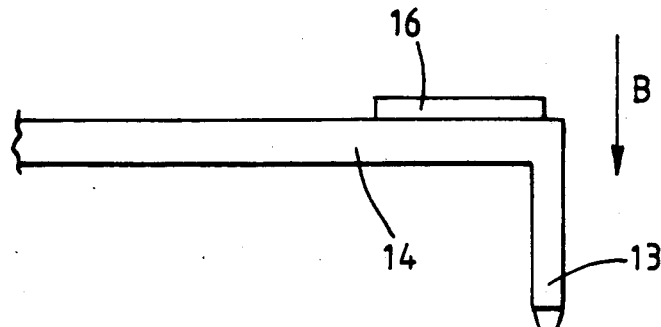
FIGS. 5, 6 and 7 are side views of a single cantilevered probe each showing different methods of monitoring its movement.
Figure 6:
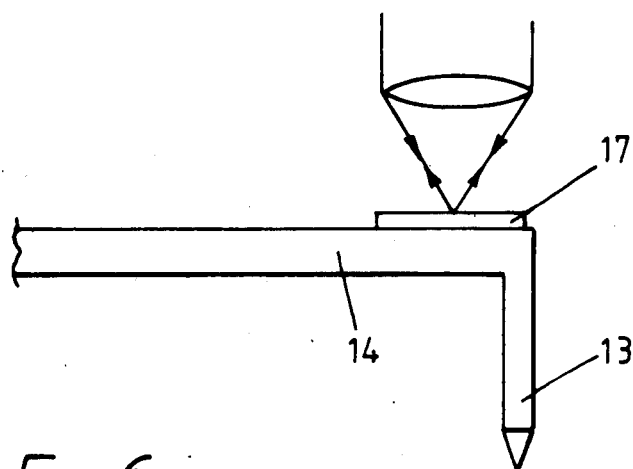
Figure 7:
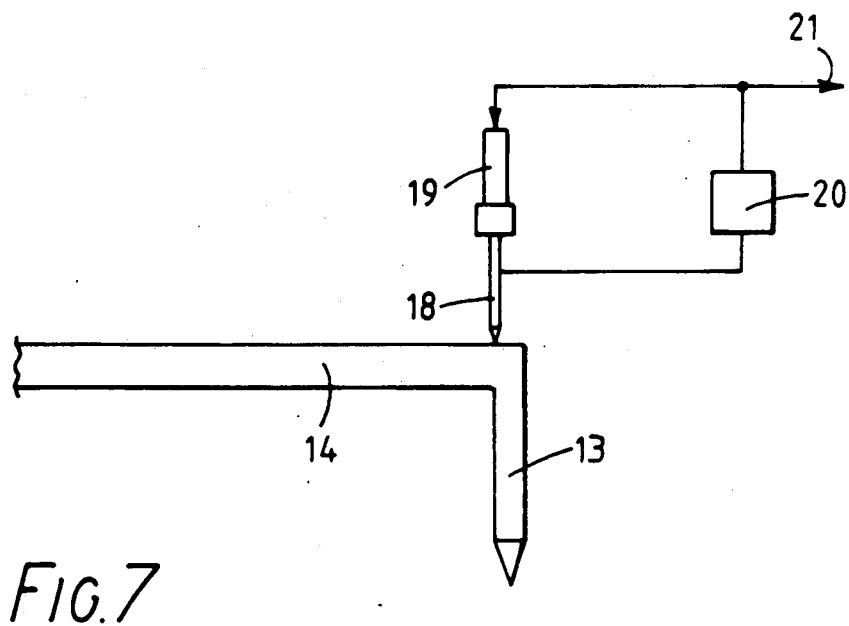

In order to determine the topography of the surface as the probe is scanned across it, the movement of the probe in the z-axis (i.e. orthogonal to the surface) must be monitored. FIGS. 5, 6 and 7 show three methods of doing this. In each case, for clarity, just a single cantilevered probe 13 is shown. In FIG. 5, a pad 16 is attached on the top surface of the cantilever and magnet means (not shown) are used to provide a magnetic field represented by the arrow B. The advantage of the magnetic technique is that feedback can be used to maintain the probe in contact with the surface 10 without the need for a physical spring, such as is provided by the cantilever. Thus the spring constant of the cantilever can be reduced to a very low level—for example 0.1 N/m or less—in order to reduce non linear effects. The arrangement illustrated in FIG. 5 can be used both to monitor movement of the cantilever and to apply the necessary force to the tip, or may be confined to the latter, the z-axis movement of the tip being monitored by alternative techniques—see for example below.

In a further alternative, not shown, an electromagnetic field is used to apply the force to the tip. The electromagnetic system would be identical with the magnetic system shown in FIG. 5, except that the pad 16 is made of light absorbing material. The required bias is achieved by illuminating the pad with laser light of the required frequency and power. Such a system may also be used to monitor the z-axis movement of the probe by optical means such as interferometry—see below.

FIG. 6 shows an electromagnetic method for monitoring the z-axis movement of the probe 13. Here, the pad 16 of FIG. 5 is replaced by a radiation reflective surface 17 onto which a beam 18 of electromagnetic radiation, for example light, is incident from a lens 19. There are various ways in which the variation in reflected light can be monitored, one of which uses interferometry, to be described in more detail below. The force to bias the probe against the surface may be provided by magnetic or electromagnetic means, or simply by relying on the spring force of the cantilever 14.

In FIG. 7, the z-axis movement of the probe 13 is monitored by a further probe 18. The probe 18 is driven by a piezoelectric bar 19. The tip of the probe 18 is spaced from the upper surface of the cantilever 14, which is made conductive, by a very short distance, for example less than 10Å. Thus potential applied between the probe 18 and the cantilever causes a current to flow between the two (see above), which current is sensitively dependant upon the gap between the tip of the probe 18 and the conductive upper surface of the cantilever. External electronics 20 measures the current flow and a feedback system is provided which applies to the piezoelectric bar 19 an energising signal such that this current flow is maintained constant. In order to do this, the probe 18 has to follow the z-axis movement of the cantilever 14 and hence probe 13. The output at 21 is thus representative of the z-axis movement. As before, the force operable to bias the probe 13 onto the surface may be magnetic, electromagnetic or spring force.

Figure 8:
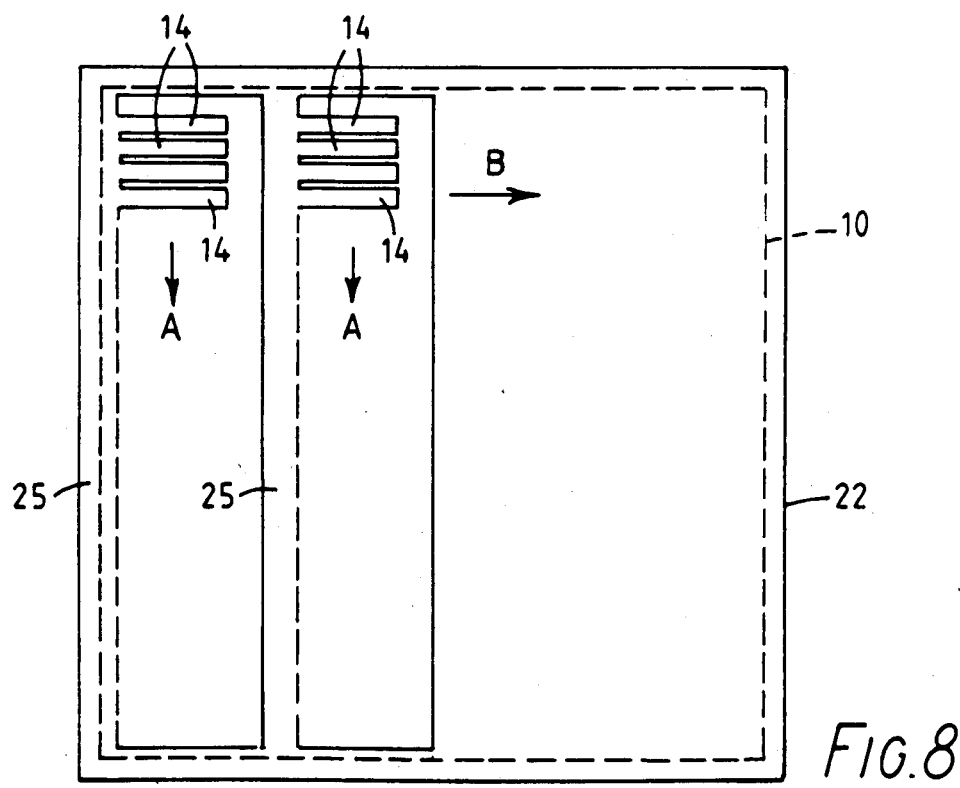

Reference is now made to FIGS. 8 and 9 which show a more practical realisation of the multi-probe scanning unit described above. The outline of the surface 10 is shown dotted in FIG. 8, but is omitted for clarity in FIG. 9. The scanning unit shown in FIGS. 8 and 9 is fabricated by micro-machining a pair of wafers, for example, of silicon, to produce large numbers of cantilevered probes. Typically, the wafers are 300 microns thick. After fabrication, the two wafers are placed together in alignment. Since the two wafers are, for our purposes, substantially identical, only the upper wafer is shown (reference 22). Any differences in the construction of the two wafers are noted below.

In its simplest form, the silicon wafer is patterned by conventional IC lithographic methods to be etched into a plurality of cantilevers 14 typically of about 10 microns square and 500 microns long, with a mesa structure on the free end of each cantilever which is activated in such a way as to be able to be made selectively adhesive—see below. The cantilevers are etched in such a way as to give the appearance of the teeth of a comb extending from ribs 25 formed at intervals along the wafer. In between the ribs 25, the wafer is machined right through save, of course, for the cantilevers which protrude into the space between the ribs. Typically, there would be 10 comb structures in all, each comb structure comprising 25 cantilevers, providing a total of 250 cantilevers to monitor a 5 mm square surface 10. For simplicity in drawing, not all the cantilevers are shown, the arrows A and B being intended to represent the continuation of the structure in the vertical and horizontal directions respectively. A second wafer, which might also be made of silicon, is patterned to give an identical set of cantilevers, exactly alignable with the first wafer, with a mesa structure on the free end of each cantilever which is so activated as to allow the selective growth by CVD of tungsten whiskers. Alternatively, the mesa structures may be treated in such a way as to be selectively adhesive and to have respective atomic dimensioned points stuck to them afterwards. The second wafer is placed over and in exact alignment with the first wafer and the sections or points of the second (upper) wafer are each caused to develop a tunnelled electron current to the upper surface of a respective aligned cantilever of the lower wafer by energizing piezoelectric elements which are deposited on the cantilevers of the upper wafer. The piezoelectric elements are provided as layers 23, 24 of piezoelectric material applied to the silicon wafer. The spring constant of the cantilevers of the lower wafer are such as to cause the whiskers 26 to exert a gentle bias on the surface 10. An array of tracks (not shown) is also deposited on the upper wafer, possibly on piezoelectric layer 23, which tracks connect each individual cantilever and the piezoelectric terminals to connections at the sides of the wafer, or to integral integrated circuits which perform all the servo feedback and amplifying functions.

In operation, the deflection of the lower cantilevers is followed by that of the upper, the piezoelectric drive current to layers 23, 24 being the measure of the topographical (z-axis) variation perceived by the lower. Similar piezoelectric layers to layers 23, 24 may also be applied to the cantilevers of the lower wafer in order to enable the maintenance of a constant spring force by the lower cantilevers. This is achieved by feedback techniques.

The structure including the upper and lower wafers is two dimensionally raster scanned in the x-y plane which corresponds to that of FIG. 8 by scanning means, for example piezoelectric elements, not shown. Typically, the scanning width along the x axis (horizontal in FIG. 8) would be 500 microns and the scanning depth along the y axis (vertical in FIG. 8) would be 10 microns. Alternatively, the surface 10 itself could be raster scanned to achieve the same effect.

The cantilevers as described have a width of just over 10 microns. At a rate of 20 lines/nm, this would require 200,000 lines to cover the 10 microns. For a 20 nm long scan, it would be expected to take 10,000 seconds or under three hours assuming a conservative 20 Hz for the line scan frequency. A wafer which includes 1000 tunnelling microscope units would encompass a square of over one cm side, enough to drive multiple and overlapping images of over 10 kb strands if laid out flat.

The measurement of the movement of the lower cantilever can be achieved by using methods other than scanning tunnelling, e.g. optical interferometric, capacitative and inductive techniques, and there are advantages in using methods which do not rely on applying electrical potentials and therefore are perhaps less susceptible to contamination effects. The structure is at least partially immersed in the liquid which keeps the DNA (or whatever) molecules in shape. The ionic content of the solution does not seem to matter insofar as any effect on the electron tunnelling phenomenon is concerned, but it could have an effect on the silicon, and would certainly affect the upper wafer electronic structures. It may be necessary to make the lowest wafer of a material other than silicon, and to have an impervious membrane between it and the upper wafer.

An alternative approach, using a magnetic or electromagnetic field as described above with reference to FIGS. 5 and 6, is shown in FIG. 10 to which reference will now be made.

FIG. 10 is similar to FIG. 9, but the cantilevers 14 are provided with a thinned down region 27 adjacent their root so that the cantilever as a whole has a very low spring constant—typically 0.1 N/m or less. A spot 28 of high coercivity magnetic material is deposited on the upper surface of the cantilevers for driving by means of a magnetic drive system (not shown). The whole scanning unit is centred in an air cored coil (not shown), and an alternating current with a dc bias is applied to the coil to attract the cantilever tips to the surface 10 with the required force, which is likely to be in the region of $10^{-10}$N. The deflection of the cantilever can be measured by any sufficiently sensitive technique, e.g. tunnelling microscope, capacitance or inductance changes, but is probably most usefully measured by optical interferometry taking advantage of the phase and frequency information to be derived from the vibration of the cantilever (see below).

It may be necessary to micro-machine stops (not shown) to limit the movement of the cantilevers because of the low spring constants. Individual fine adjustment of the cantilevers by piezoelectric means can be built into the system (by CVD or other suitable techniques) if needed to cope with grossly deformed substrates.

The electromagnetic system for applying the force would be identical with the exception of the magnetic spots, which would be replaced by an upper light absorbing spot. The application of the cantilever tip to the surface is now achieved by illuminating the spot with laser light of the required frequency and power. This may also be used to derive the positional information by interferometry.

Figure 11:
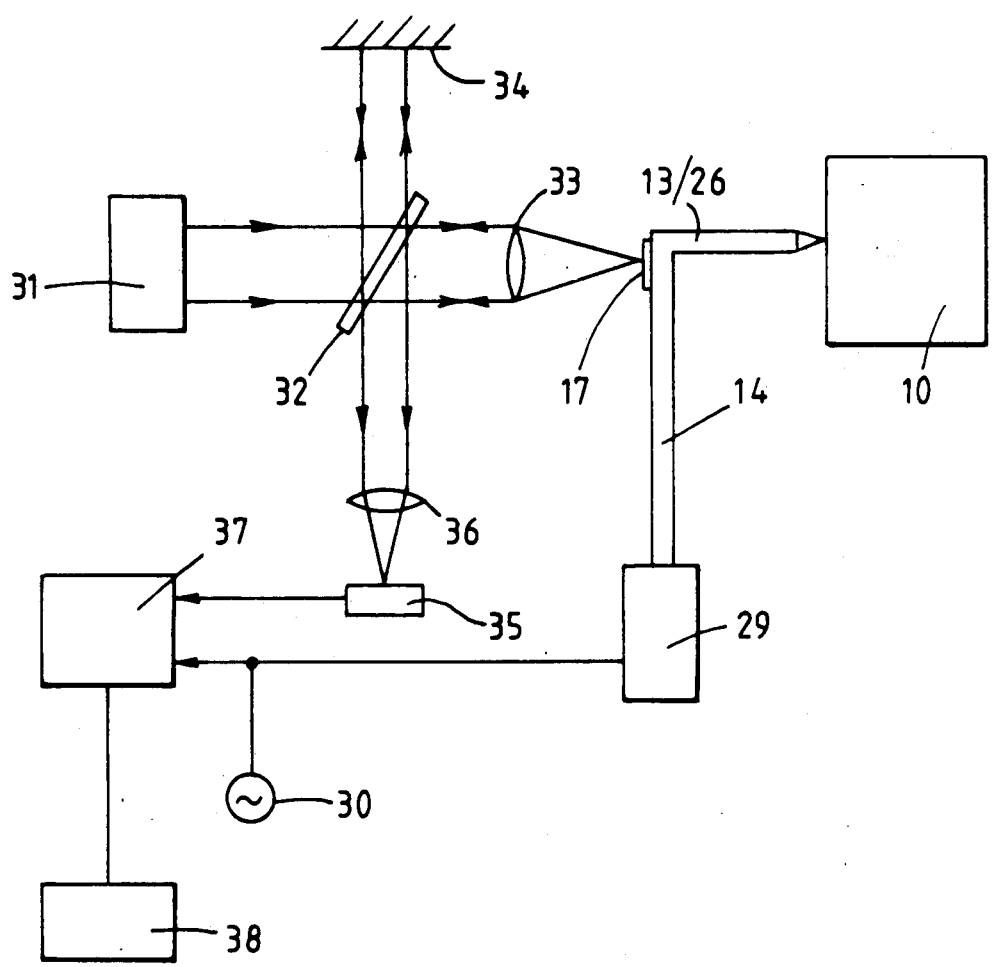
FIG. 11 is a block diagram of an optical interferometric system operable to handle the data from the reflective cantilever assembly of FIG. 6.

Reference will now be made to FIG. 11 which shows an electromagnetic system using interferometry for monitoring the z-axis movement of the probe 13,26 as it is scanned across the surface 10. Although not shown, it is to be understood that some means are provided for lightly biassing the tip of the probe onto the surface 10. This may be achieved by the magnetic or optical fields discussed above, or be relying simply on the spring constant of the cantilever 14 itself. As an alternative, the surface 10 itself can be biased in a direction towards the probe to provide the necessary light force between the two.

The probe is oscillated in the z-axis direction by a cantilever drive means 29 which is itself energised by an oscillator 30. The frequency of the cantilever drive system is typically in the range 10 KHz to 100 KHz. The main purpose of oscillating the probe in this way is to reduce the tendency of the probe tip to stick to the surface due to Van Der Waals forces; instead of applying constant pressure, the probe adopts a "tapping" motion so that the probe tip samples the surface at discrete intervals as scanning proceeds. The technique of oscillating the probe also provides better noise performance, because unwanted frequencies can be filtered out, and better sensitivity. Although described in relation to an optical method of monitoring cantilever movement, the technique can, of course, be used with the other methods, such as magnetic and electron tunnelling.

The electromagnetic method of monitoring cantilever movement is by way of a radiation reflecting surface 17 (see above, with reference to FIG. 6). The radiation source comprises a laser 31 whose output is directed via a beam splitter 32, set at 45° to the beam axis, and a lens 33 to the surface 17. The beam splitter 32 comprises a semi-silvered mirror which allows some of the incident light to proceed through undeflected, but which reflects some of the laser output onto a plane mirror 34. Light incident on mirror 34 is reflected back to the beam splitter along the same path. Likewise, the light incident on reflecting surface 17 is reflected back along the same path to the beam splitter. Note however that the reflecting surface 17 is subject to z-axis movement due to undulations on the surface, superimposed on a continuous wave oscillation due to oscillator 30 and cantilever drive means 29. Therefore the phase of the light reflected at surface 17 is varying in sympathy with this movement. The two reflected beams meet and interfere with one another at the beam splitter 32 and the resultant fringe pattern is directed to a light detector 35 via a further lens 36. Z-axis movement of the cantilever results in corresponding movement of the fringe pattern across the detector and this can be detected as alternating areas of high and low intensity light as the fringe pattern moves. In practice the amount of movement in the cantilever is so small that only a single fringe needs to be monitored, and this can be achieved with a single detector. If it is necessary to view the whole fringe pattern, a detector array or large-area detector would be necessary.

The electrical output of the detector 35 is taken to a mixer 37 where the detector signal is heterodyned with the output from the oscillator 30 in order to extract a signal due solely to the movement of the cantilever across the surface. The resultant output is taken to external electronics for computer analysis, or direct to a display 38.

In FIG. 11, only a single probe/cantilever assembly is shown for clarity. In practice many such assemblies, each with their own associated monitoring systems will be needed to cover the total area of the surface 10 (see above). Although not shown, it is assumed that means are provided for the x-y scanning of the probes 13/26 across the plate, in the manner described previously, either by movement of the probes, or by movement of the surface 20, or both.

In the arrangement of FIG. 11, a further improvement in sensitivity and noise performance can be achieved by setting the frequency of oscillator 30 to be equal to the resonant frequency of the cantilever assembly when in its free state (i.e. not biassed against surface 10). This is typically 16 KHz. When the probe is biassed against the surface by any of the methods discussed above the resonant frequency will change due to increased damping, and this manifests itself as a change of phase in the light reflected from surface 17. This phase change can be detected by means of a phase locked loop, as illustrated in FIG. 12.

Figure 12:
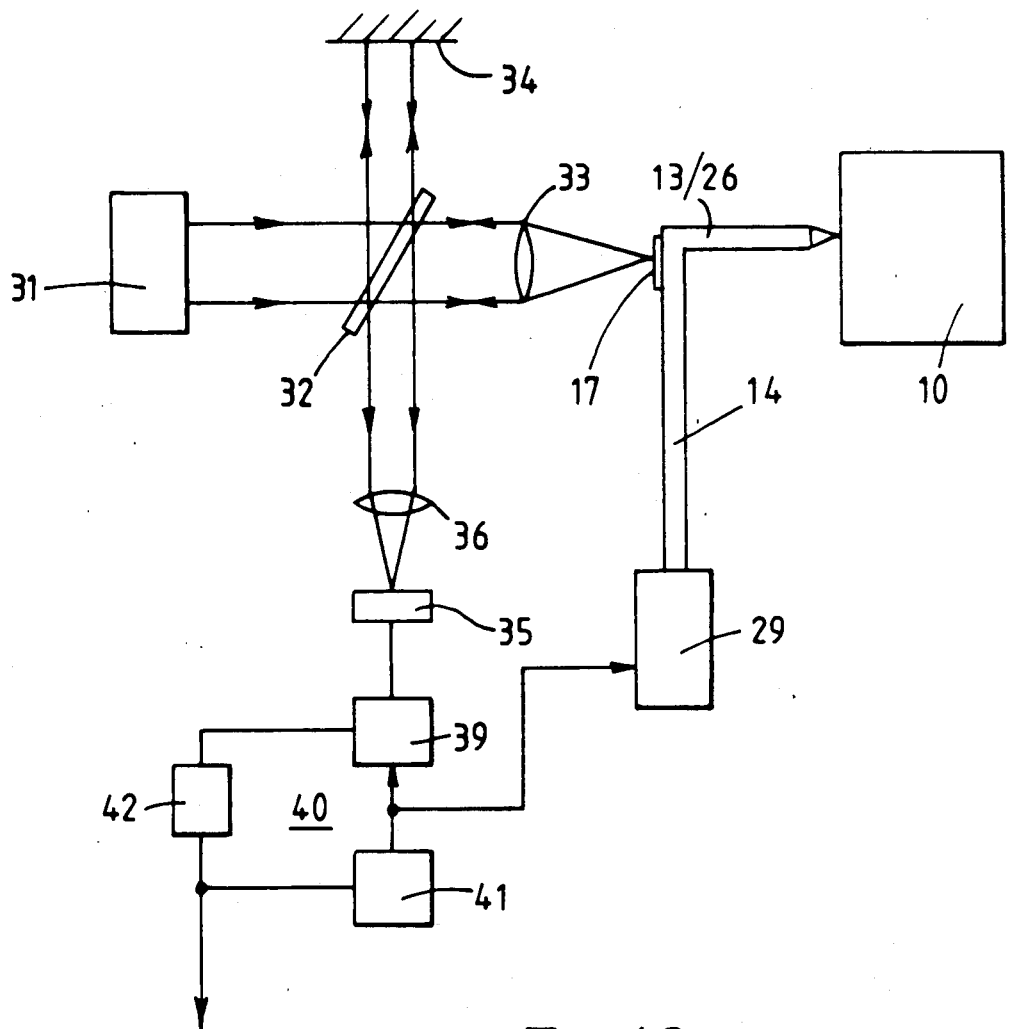
FIG. 12 is a block diagram similar to FIG. 11, but showing an alternative embodiment.

In FIG. 12, the electrical output of the light detector 35 is applied to one input of a phase detector 39 forming part of a phase locked loop 40. The other input to the phase detector 39 is taken from the loop VCO (voltage controlled oscillator) 41. The output from VCO 41 is also applied to the drive means 29. The control voltage for the VCO is developed from the output of the phase detector 39 be means of a loop filter 42. The output from loop filter 42 is a measure of the atomic force on the tip of the probe which varies as the undulations on the surface 10 are followed.

The techniques described herein enable the direct analysis of DNA and similar molecules. The analysis of individual lengths of the molecule enables the building up of a complete picture of the order of bases within the whole molecule, using computer matching techniques and similar known methods. The result of macromolecular interactions can also be structurally analysed, possibly after functional analysis of the same surface by surface plasmon resonance.

Although it has been assumed that the surface 10 is flat, and automatically smooth, those techniques can also be applied to curved surfaces where this proves to be more convenient.

We claim:

1. A method for the high resolution imaging of macromolecules and interactions involving macromolecules, said method comprising placing a molecule under test on a surface, said surface being notionally subdivided into a plurality of individual areas, scanning said surface at high resolution by means of scanning tunnelling and/or atomic force microscope apparatus incorporating a plurality of fine probes each associated with one of said areas, said scanning comprising scanning each of said probes across its individual area, detecting movement of each of said probes in a direction transverse to the surface due to undulations in the surface, and displaying the resultant of said scanning so that the topography of the surface can be ascertained.

2. The method according to claim 1 further comprising immobilizing the macromolecule under test onto the surface.

3. The method as claimed in claim 2 wherein one end of the marcomolecule is attached to the surface and a fluid is then caused to flow across the surface so that the molecule is aligned in a particular direction.

4. Apparatus for the high resolution imaging of macromolecules and interactions involving macromolecules, said apparatus comprising a surface on which a molecule under test is placed for analysis, said surface being notionally subdivided into a plurality of individual areas, a plurality of fine probes each associated with one of said areas, means for simultaneously moving said probes across the surface in such a way that each probe scans across its associated area, means for monitoring the movement of said probes in a direction transverse to the surface due to undulations in the surface, and display means for displaying the output from said monitoring means being illustrative of the topography of the surface.

5. Apparatus as claimed in claim 4 including means for lightly biassing each probe onto the surface.

6. Apparatus as claimed in claim 5 wherein the probes are mounted on a frame, and wherein the apparatus further comprises means for causing scanning movement of said frame such as to cause said probes to simultaneously execute scanning movement over their associated areas.

7. Apparatus as claimed in claim 4 wherein the probes are mounted on a frame, and wherein the apparatus further comprises means for causing scanning movement of said frame such as to cause said probes to simultaneously execute scanning movement over their associated areas.

8. Apparatus as claimed in claim 7 wherein said frame comprises a sheet of material which has been micromachined to define a plurality of fingers, each finger being attached at one end to the sheet and being free at the other end, said other (free) end carrying a respective one of said probes.

9. Apparatus as claimed in claim 8 wherein said fingers are arranged in rows in the manner of teeth of a comb and wherein a plurality of rows are machined from a single sheet in order to provide a two-dimensional array of probes.

10. Apparatus as claimed in any one of claims 7, 8 or 9 wherein two similar frames carrying probes are provided: a first frame being arranged so that its probes monitor the surface, and a second frame being positioned overlying the first frame so that the movement of each probe on the first frame may be monitored by a corresponding probe on the second frame.

11. Apparatus as claimed in claim 10 and wherein, on at least that part of said sheet forming the fingers of said second frame, there is deposited at least one layer of piezoelectric material, and wherein said monitoring means includes electrical connections made to said piezoelectric material whereby movement of each of said fingers may be monitored by monitoring the electrical current generated by said piezoelectric material.

12. Apparatus as claimed in claim 11 wherein said monitoring means incorporates an scanning tunnelling detector for monitoring movement of each probe.

13. Apparatus as claimed in claim 10 wherein said monitoring means incorporates an optical interferometric detector for monitoring movement of each probe.

14. Apparatus as claimed in claim 10 wherein said monitoring means incorporates an inductive detector for monitoring movement of each probe.

15. Apparatus as claimed in claim 10 wherein said monitoring means incorporates an scanning tunnelling detector for monitoring movement of each probe.

16. Apparatus as claimed in any one of claims 4, 5, 7, 8, and 10 wherein said monitoring means incorporates an optical interferometric detector for monitoring movement of each probe.

17. Apparatus as claimed in any one of claims 4, 5, 7, 8 and 10 wherein said monitoring means incorporates an inductive detector for monitoring movement of each probe.

18. Apparatus as claimed in any one of claims 4, 5, 7, 8 and 10 wherein said monitoring means incorporates a scanning tunnelling detector for monitoring movement of each probe.

* * * * *